United States Patent
Tsuji et al.

(10) Patent No.: US 11,209,348 B2
(45) Date of Patent: Dec. 28, 2021

(54) HAIR OBSERVATION METHOD, PHASE CONTRAST MICROSCOPE SYSTEM, AND PREPARATION

(71) Applicants: RIKEN, Saitama (JP); ORGAN TECHNOLOGIES, INC., Tokyo (JP); KYOCERA Corporation

(72) Inventors: Takashi Tsuji, Wako (JP); Koh-ei Toyoshima, Tokyo (JP); Kazuto Miyazaki, Tachikawa (JP); Takashi Saotome, Ome (JP)

(73) Assignees: KYOCERA CORPORATION, Kyoto (JP); RIKEN, Saitama (JP); ORGAN TECHNOLOGIES, INC., Tokyo (JP)

(*) Notice: Subject to any disclaimer, the term of this patent is extended or adjusted under 35 U.S.C. 154(b) by 138 days.

(21) Appl. No.: 16/608,012

(22) PCT Filed: Apr. 18, 2018

(86) PCT No.: PCT/JP2018/016028
§ 371 (c)(1),
(2) Date: Oct. 24, 2019

(87) PCT Pub. No.: WO2018/198908
PCT Pub. Date: Nov. 1, 2018

(65) Prior Publication Data
US 2021/0102890 A1   Apr. 8, 2021

(30) Foreign Application Priority Data
Apr. 24, 2017 (JP) .............................. JP2017-085621

(51) Int. Cl.
*G01N 21/27* (2006.01)
*G01N 21/359* (2014.01)
(Continued)

(52) U.S. Cl.
CPC .......... *G01N 21/27* (2013.01); *G01N 21/359* (2013.01); *G02B 21/12* (2013.01); *G02B 21/14* (2013.01); *G02B 21/34* (2013.01)

(58) Field of Classification Search
CPC ...... G01N 21/27; G01N 21/359; G02B 21/12; G02B 21/14; G02B 21/34
See application file for complete search history.

(56) References Cited

U.S. PATENT DOCUMENTS 8,808,625 B2   8/2014   Aoki et al.
9,091,855 B2   7/2015   Sakaguchi
(Continued)

FOREIGN PATENT DOCUMENTS

EP   2275851 A1   1/2011
JP   2009-186455 A   8/2009
(Continued)

*Primary Examiner* — Jamil Ahmed
(74) *Attorney, Agent, or Firm* — Hauptman Ham, LLP (57) ABSTRACT

Provided are a hair observation method, a phase contrast microscope system, and a preparation. The hair observation method includes capturing an infrared image of the hair using an image sensor that is capable of detecting infrared light. A phase contrast microscope system includes: a stage having a sample placed thereon; an infrared light irradiation source for irradiating infrared light to the sample placed on the stage; an image sensor that is capable of detecting infrared light and configured to capture an infrared image of the sample; and a display apparatus configured to display the infrared image captured by the image sensor. The preparation includes a microscope glass and a plurality of hair pieces that are obtained by cutting one hair and arranged on the microscope glass in a manner parallel with one another from one end to another end in a cutting order.

18 Claims, 6 Drawing Sheets

(51) Int. Cl.
  *G02B 21/12* (2006.01)
  *G02B 21/14* (2006.01)
  *G02B 21/34* (2006.01)

(56) References Cited

U.S. PATENT DOCUMENTS

| | | | |
|---|---|---|---|
| 10,223,765 | B2 | 3/2019 | Ohashi |
| 2003/0134271 | A1* | 7/2003 | Martin ............... G01N 21/6486 435/5 |
| 2004/0184144 | A1 | 9/2004 | Goodwin |
| 2008/0174860 | A1* | 7/2008 | Yelleswarapu ..... G02F 1/13725 359/370 |
| 2009/0099541 | A1* | 4/2009 | Qin ........................ A61F 13/53 604/376 |
| 2009/0180930 | A1 | 7/2009 | Aoki et al. |
| 2013/0229707 | A1 | 9/2013 | Sakaguchi |
| 2015/0228053 | A1 | 8/2015 | Ohashi |
| 2018/0224646 | A1 | 8/2018 | Wakui |
| 2019/0147563 | A1 | 5/2019 | Ohashi |

FOREIGN PATENT DOCUMENTS

| | | | | |
|---|---|---|---|---|
| JP | 2014-43403 A | | 3/2014 | |
| JP | 2014043403 A | * | 3/2014 | ............... A61K 8/19 |
| JP | 2015-190989 A | | 11/2015 | |
| JP | 2015190989 A | * | 11/2015 | ............ G02B 21/34 |
| JP | 2016-38335 A | | 3/2016 | |
| JP | 2017-72700 A | | 4/2017 | |
| WO | 2013/047315 A1 | | 4/2013 | |
| WO | 2014/038408 A1 | | 3/2014 | |

* cited by examiner

HAIR OBSERVATION METHOD, PHASE CONTRAST MICROSCOPE SYSTEM, AND PREPARATION

RELATED APPLICATIONS

The present application is a national phase of International Application Number PCT/JP2018/016028, filed Apr. 18, 2018, which claims priority to and the benefit of Japanese Patent Application No. 2017-085621, filed Apr. 24, 2017.

TECHNICAL FIELD

The present disclosure relates to a hair observation method, a phase contrast microscope system, and a preparation that are used for observing an inside of a hair.

BACKGROUND

A diagnostic method for making a diagnoses of a health condition of a hair or a human body based on a result of optical observation of the hair is known. In order to make a diagnosis of a hair as described above, it is conventionally performed to cut a hair into a ultra-thin slice in a cross sectional direction and observe an internal structure of a cross-section of the hair including a hair cortex and a hair medulla in addition to a hair cuticle constituting the surface of the hair, using an electron microscope.

However, this method requires a lot of preparation works including cutting a hair and thus inhibits easy observation.

As such, a method for observing an inside of a hair using a phase contrast microscope that eliminates the necessity to cut the hair is suggested. For example, PTL 1 set forth below describes a hair observation method for observing an inside of a hair using a phase contrast microscope equipped with a high intensity LED as a light source.

CITATION LIST

Patent Literature

PTL 1: JP-A-2014-43403

SUMMARY

Technical Problem

However, the conventional hair observation method described above has a problem that an inside of a hair cannot be clearly visualized and thus inhibits detailed observation of an internal structure of the hair.

In view of the above problem, the present disclosure aims to provide a hair observation method, a phase contrast microscope system, and a preparation that enable easy and detailed observation of an inside of a hair.

Solution to Problem

A hair observation method of the present disclosure is a hair observation method for observing an inside of a hair and includes: performing phase contrast observation by irradiating infrared light to the hair; capturing an infrared image of the hair using an image sensor capable of detecting infrared light; and displaying the infrared image captured by the image sensor on a display apparatus and observing the inside of the hair.

The hair observation method of the present disclosure having the above configuration includes: performing bright field observation by irradiating visible light to the hair; capturing a bright light image of the hair using an image sensor that is capable of detecting visible light; and observing a first captured image obtained by irradiating infrared light to the hair and performing phase contrast observation and a second captured image obtained by irradiating visible light to the hair and performing bright field observation.

The hair observation method of the present disclosure having the above configuration includes comparably displaying the first captured image and the second captured image on the display apparatus.

The hair observation method of the present disclosure having the above configuration includes coloring the first captured image by adding color information of the second captured image to illuminance information of the first captured image and displaying a colored first captured image on the display apparatus.

The hair observation method of the present disclosure having the above configuration includes using the image sensor as the image sensor for capturing an infrared image of the hair and also as the image sensor for capturing a visible light image of the hair.

The hair observation method of the present disclosure having the above configuration uses near infrared light having a peak intensity at a wavelength in a range of 0.70 to 1.45 µm as infrared light irradiated to the hair.

A phase contrast microscope system of the present disclosure is a phase contrast microscope system for performing phase difference observation of a sample and includes: a stage having a sample placed thereon; an infrared light irradiation source for irradiating infrared light to the sample placed on the stage; an image sensor that is capable of detecting infrared light and configured to capture an infrared image of the sample; and a display apparatus configured to display the infrared image captured by the image sensor.

The phase contrast microscope system of the present disclosure having the above configuration further includes: a visible light irradiation source for irradiating visible light to the sample placed on the stage; and an image sensor that is capable of detecting visible light and configured to capture a visible light image of the sample. The phase contrast microscope system is configured to be able to switch between a phase contrast observation mode for performing phase contrast observation by irradiating infrared light to the sample and a bright filed observation mode for performing bright field observation by irradiating visible light to the sample. The phase contrast microscope system can display a first captured image obtained in the phase contrast observation mode and a second captured image obtained in the bright field observation mode on a display apparatus.

The phase contrast microscope system of the present disclosure having the above structure includes a memory configured to store the first captured image and the second captured image and enables a comparable display of the first captured image and the second captured image on the display apparatus.

The phase contrast microscope system of the present disclosure having the above structure includes an image processing unit configured to color the first captured image by adding color information of the second captured image to luminance information of the first captured image and display the first captured image colored by the image processing unit on the display apparatus.

In the phase contrast microscope system of the present disclosure having the above structure, the image sensor is used as the image sensor for capturing the infrared image of the sample and also as the image sensor for capturing the visible light image of the sample.

In the phase contrast microscope system of the present disclosure having the above structure, the infrared light irradiation source irradiates near infrared light having a peak intensity at a wavelength in a range of 0.70 to 1.45 μm.

A preparation of the present disclosure is a preparation used by the hair observation method described above or the phase contrast microscope system described above and includes a microscope glass and a plurality of hair pieces obtained by cutting one hair and arranged on the microscope glass in a manner parallel to one another in a cutting order from one end to another end.

In a preparation of the present disclosure having the above configuration, the microscope glass is provided with a graduation mark that enables determination on a longitudinal location of the hair piece.

In a preparation of the present disclosure having the above configuration, the microscope glass is provided with a plurality of scales that are arranged in parallel with the hair piece.

In a preparation of the present disclosure having the above configuration, the plurality of hair pieces are fixed to the microscope glass by a cover glass.

Advantageous Effect

The present disclosure can provide a hair observation method, a phase contrast microscope system, and a preparation that enable easy and detailed observation of an inside of a hair.

DETAILED DESCRIPTION

Hereinafter, an embodiment of the present disclosure will be described in detail with reference to the accompanying drawings.

A hair observation method according to the present embodiment is a hair observation method for observing an inside of a hair and includes: performing phase contrast observation by irradiating infrared light to the hair; capturing an infrared image using an image sensor that is capable of detecting infrared light; and displaying the infrared image captured by the image sensor on a display apparatus and observing the inside of the hair.

The hair observation method according to the present embodiment may be employed as, for example, a diagnostic method for optically observing a hair and making a diagnosis of a health condition of the hair or a human body from a result of the observation.

According to the hair observation method of the present embodiment, infrared light having a longer wavelength than visible light is irradiated to a hair, and phase contrast observation of the hair is performed using light that has passed through the hair or reflected on the surface of the hair. Thus, without the necessity to cut the hair in a longitudinal cross-section and by using a hair as it stands, a detailed image of an inside of the hair including a hair cortex (cortex) and a hair medulla (medulla) in addition to a hair cuticle (cuticle) may be obtained by performing phase contrast observation. Although the infrared image of the hair obtained by performing phase contrast observation cannot be directly viewed, the infrared image is captured by an image sensor capable of detecting infrared light and then displayed on a display apparatus such as a liquid crystal display. Thus, the image of the hair obtained by performing phase contrast observation can be clearly visualized. Accordingly, the hair observation method of the present embodiment enables easy and detailed observation of the inside of the hair. Further, a health condition of the hair or the human body can be easily dragonized based on the captured image of the hair obtained by performing the hair observation method of the present embodiment, and the accuracy of the diagnosis can be improved.

Further, according to the hair observation method of the present embodiment, in performing phase contrast observation a focal point with respect to a hair is adjusted to, for example, a midpoint between the cuticle and the medulla and thus can clearly display the internal structure and the surface structure of the hair on the display apparatus at the same time. That is, the medulla and the cuticle of the hair can be clearly visualized at the same time. The conventional hair observation methods can selectively observe only one of the medulla and the cuticle of the hair and cannot simultaneously observe both of them. However, the hair observation method of the present embodiment can simultaneously observe the cuticle and the medulla in detail, as described above. Thus, a diagnosis of a hair or a human health state using the hair can be performed more easily and reliably.

Infrared light irradiated to a hair in the phase contrast observation described above preferably has a single wavelength in a range of 0.70 μm to 1.45 μm. However, light other than infrared light such as visual light or ultraviolet that has a peak intensity at a wavelength in the above range may be included. In the present embodiment, the peak wavelength of infrared light is 860 nm.

Preferably, infrared light irradiated to a hair in the phase contrast observation described above is near infrared light having a peak intensity at a wavelength in the range of 0.70 μm to 1.45 μm. In this case, preferably, infrared light is irradiated by an LED light source having a peak irradiation wavelength in the range of 0.70 μm to 1.45 μm. More preferably, infrared light irradiated to a hair in the phase contrast observation described above is near infrared light having a peak intensity at a wavelength in a range of 0.80 μm to 1.00 μm. From the viewpoint of a LED light source which is readily available, it is particularly preferable to irradiate near infrared light having a peak intensity at a wavelength in a range of 0.85 μm to 0.95 μm. This enables more clear visualization of an internal structure of a hair by the phase contrast observation.

When infrared light irradiated to the hair in the phase contrast observation described above is near infrared light having a peak intensity at a wavelength in the range of 0.70

μm to 1.45 μm, particularly by setting a focal point with respect to a hair to a midpoint between the cuticle and the medulla, the cuticle and the medulla can be more clearly visualized. These findings can be obtained only after performing phase contrast observation by irradiating infrared light to a hair and can solve new problems that cannot be caused by the conventional hair observation methods.

In the hair observation method according to the present embodiment described above, in addition to the phase contrast observation that irradiates infrared light to a hair, bright field observation that irradiates visual light to the same hair and captures an visible light image of the hair using an image sensor capable of detecting visible light may be performed. Then, the inside of the hair may be observed using a first captured image obtained by performing the phase contrast observation irradiating infrared light to the hair and a second captured image obtained by performing the bright field observation irradiating visible light to the hair.

By alternately performing phase contrast observation using infrared light and bright field observation using visible light on the same hair, the inside of the hair can be observed in detail, in addition to a state, color and the like of the surface of the hair. Thus, a diagnosis of a health state of the hair or a human body based on the hair can be more easily and reliably made.

When alternately performing phase contrast observation and bright field observation of the same hair as described above, the first captured image obtained by performing phase contrast observation that irradiates infrared light to the hair and the second captured image obtained by performing bright field observation that irradiates visible light to the same hair may be comparably displayed on the display apparatus. Thus, the hair can be more easily and reliably observed or diagnosed by comparing the internal structure of the hair obtained by performing phase contrast observation that irradiates infrared light to the hair and a state, color and the like of the surface of the hair obtained by performing bright field observation that irradiates visible light to the hair.

As methods for comparably displaying the first caped image and the second captured image on the display apparatus, for example, the first captured image and the second captured image may be arranged side by side or in a vertical manner and simultaneously displayed on the display apparatus, or alternately displayed on the display apparatus. Other methods for comparably displaying the first captured image and the second captured image may be also employed.

Also, in performing phase contrast observation and bright field observation of the same hair as described above, the first captured image may be colored by adding color information of the second captured image obtained by performing bright field observation that irradiates visible light to the hair to illuminance information of the first captured image obtained by performing phase contrast observation that irradiates infrared light to the hair, and a colored first captured image may be displayed on the display apparatus for observation of the hair. That is, an image of the hair is expressed as a contrast between light and dark in phase contrast observation. However, by adding the color information obtained from the second captured image of a particular portion of the hair to the luminance information regarding the contrast of the predetermined portion of the hair, the surface and the internal structure of the predetermined portion of the hair can be expressed in color. This configuration can more clearly visualize the medulla and the cuticle when, for example, a focal point with respect to the hair is adjusted for simultaneous observation of the medulla and the cuticle. Thus, the hair can be more easily and reliably observed or diagnosed.

Preferably, when performing the phase contrast observation and the bright field observation of the same hair as described above, the image sensor is used for capturing an infrared image of a hair and also for capturing a visible light image of the hair. Thus, one image sensor can capture both the first captured image and the second captured image, and the hair observation method can be easily performed at low cost.

Figure 1:
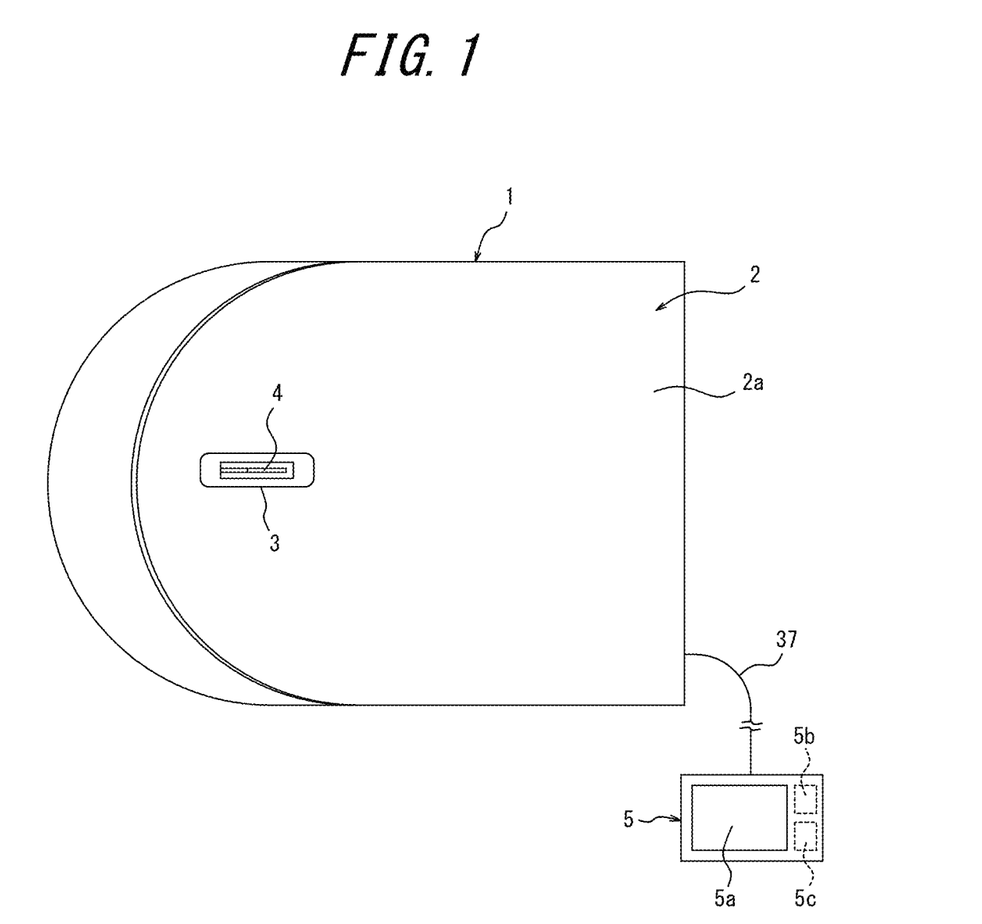
FIG. 1 is a perspective view of a phase contrast microscope system according to an embodiment of the present disclosure.
Figure 2:
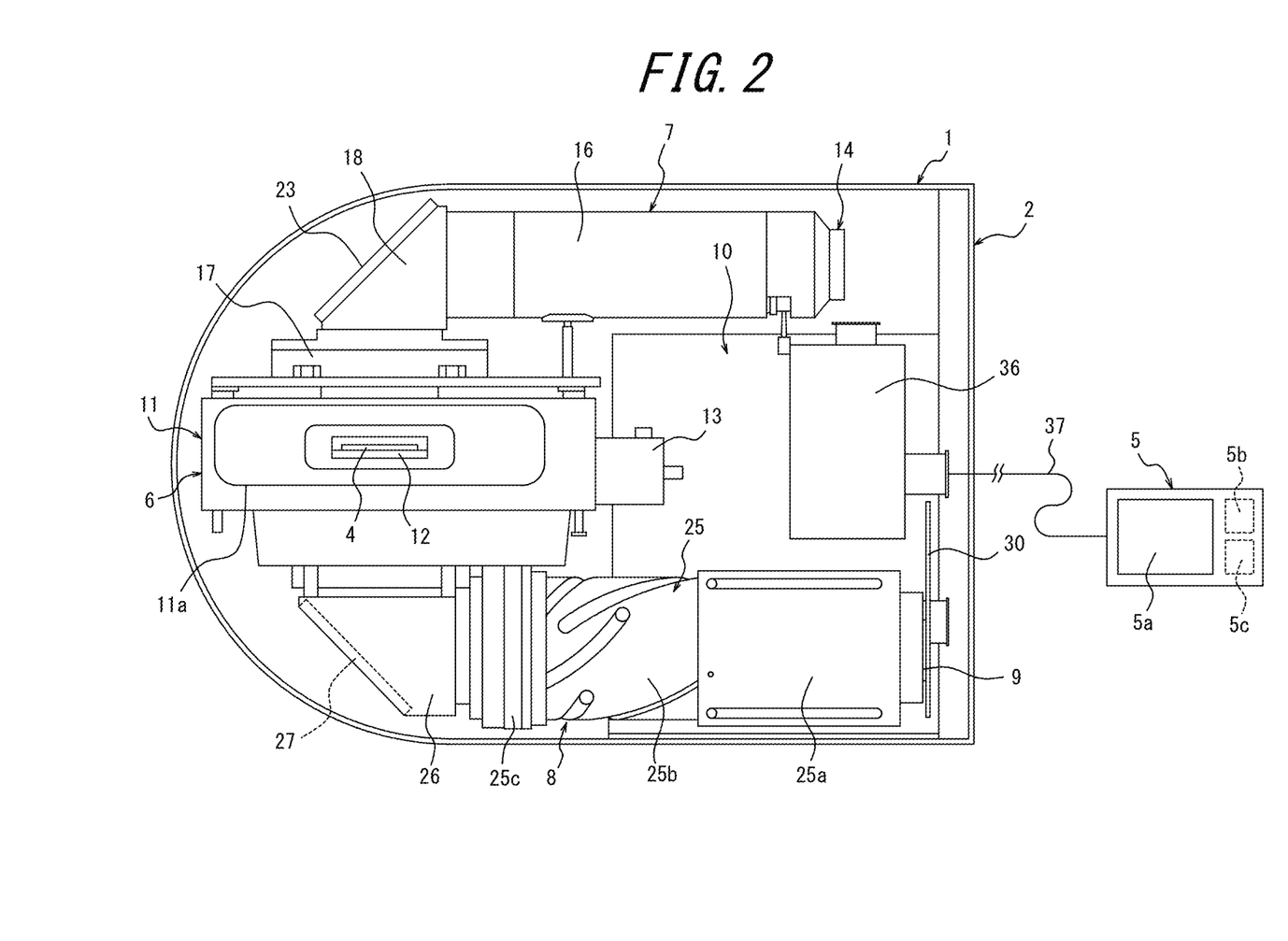
FIG. 2 is a side view of a phase contrast microscope illustrated in FIG. 1, from which a side cover is removed.
Figure 3:
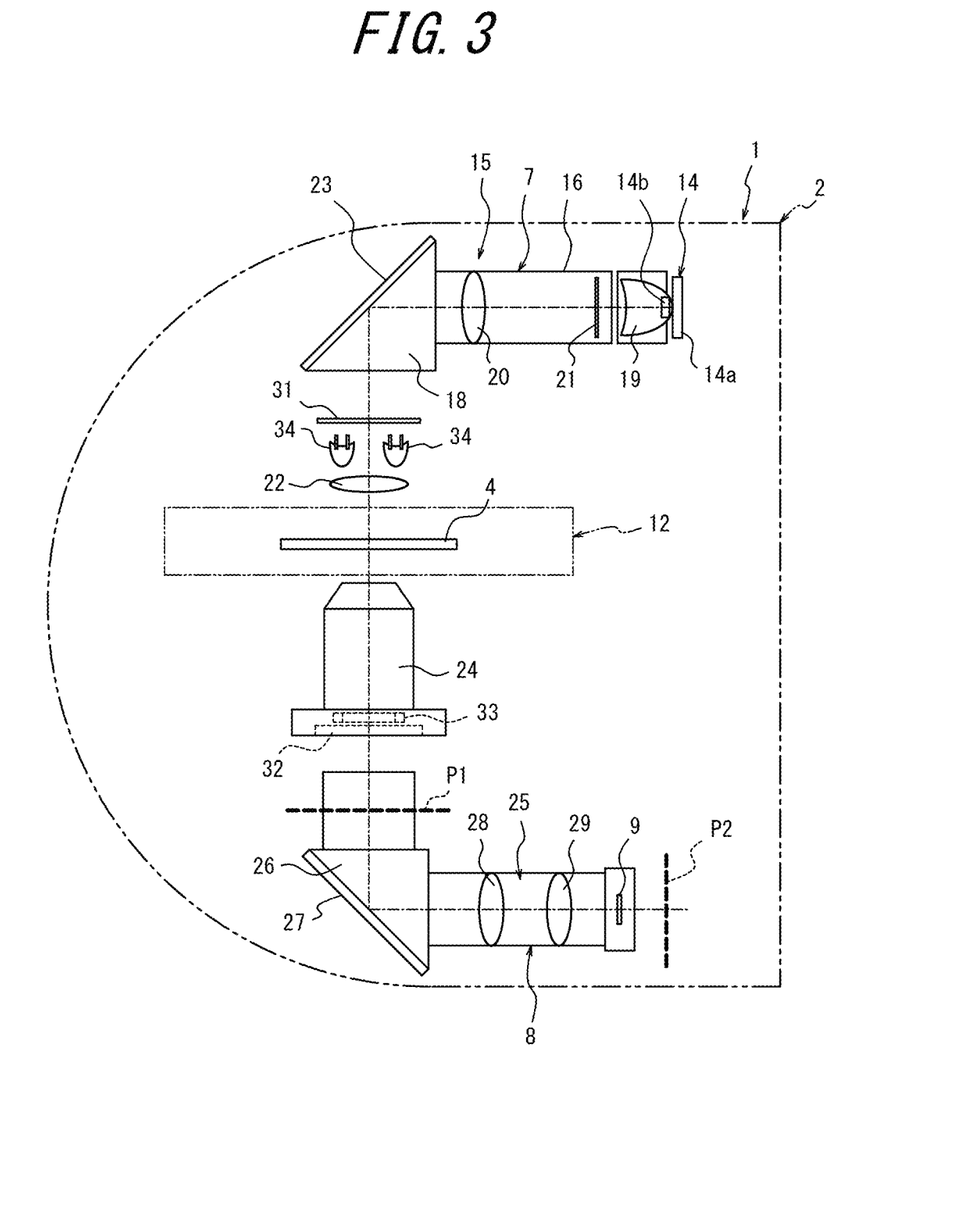
FIG. 3 is an explanatory diagram schematically illustrating an optical system of the phase contrast microscope illustrated in FIG. 1.

The hair observation method of the present embodiment described above can be performed using, for example, a phase contrast microscope system illustrated in FIG. 1 to FIG. 3.

The phase contrast microscope system according to the embodiment of the present disclosure illustrated in FIG. 1 to FIG. 3 is used for phase difference observation that visually magnifies a sample such as a hair using a phase contrast microscope 1 of an optical type. The phase contrast microscope 1 includes a casing 2 (housing) that is formed from a resin material such as plastic or a metal plate and is configured as one unit enclosing an optical system therein.

The phase contrast microscope 1 configured as one unit can be easily carried as the casing 2. Thus, the phase contrast microscope 1 can be carried to various places such as a diagnosis site, a shop, and the like and enables observation or diagnosis of a hair on the spot.

Note that the phase contrast microscope 1 is not limited to be portable and may be stationary.

A side cover 2a of the casing 2 is provided with a sample entry 3, into which a preparation 4 is to be inserted. When the phase contrast microscope 1 is connected to a display apparatus 5 and the preparation 4 is inserted, the phase contrast microscope 1 magnifies an image of a sample placed on the preparation 4 and displays a magnified image of the sample on the display apparatus 5 serving as a monitor or the like. As described above, the phase contrast microscope system is of a monitor type that displays a magnified image of a sample on the display apparatus 5 for observation.

The phase contrast microscope 1 is used in an upright state in which the side cover 2a is in a vertical orientation and the preparation 4 inserted into the sample entry 3 is in a horizontal orientation. Hereinafter, the phase contrast microscope 1 is assumed to be in the upright state.

As illustrated in FIG. 2, the phase contrast microscope 1 includes a stage unit 6, an infrared light irradiation apparatus 7, an observation optical apparatus 8, an image sensor 9, and a control board 10.

The stage unit 6 includes a retainer frame 11 fixed to the casing 2, and a stage 12 enclosed in the retainer frame 11. A side surface of the retainer frame 11 includes an opening 11a connected to the sample entry 3 of the casing 2. The preparation 4 inserted into the sample entry 3 of the casing 2 is placed on the stage 12 via the opening 11a. That is, by inserting the preparation 4 through the sample entry 3, the sample is placed on the stage 12. In the upright state of the phase contrast microscope 1, the stage 12, i.e., the preparation 4 of the stage 12 is placed on a horizontal surface.

A drive unit 13 is attached to the retainer frame 11. The stage 12 can be driven by the drive unit 13 and shifted in the horizontal direction (in an XY direction) or the vertical direction (in a Z-axis direction). When the stage 12 is shifted, the preparation 4 placed on the stage 12 is also shifted in the horizontal direction (in the XY direction) or the vertical direction (in the Z-axis direction) following the shift of the stage 12. The drive unit 13 may include three electric motors (not illustrated) corresponding to the X, Y, and Z directions, respectively, and may be configured to convert a rotary motion of the electric motors into a linear motion in each direction using a screw mechanism. Alternatively, the drive unit 13 may have another configuration.

The infrared light irradiation apparatus 7 is configured to irradiate infrared light to a sample placed on the stage 12. The infrared light irradiation apparatus 7 includes an infrared light irradiation source 14 and an irradiation optical system 15 and is arranged above the stage 12. In the present embodiment, the infrared light irradiation apparatus 7, i.e. the infrared light irradiation source 14 and the irradiation optical system 15 employ Miler illumination to uniformly irradiate infrared light to the sample.

The infrared light irradiation source 14 is configured as, for example, an infrared LED 14b mounted on the substrate 14a and attached to an edge on the side opposite from an upper mirror unit 18 of an irradiation casing 16. The infrared light irradiation source 14 can irradiate infrared light (electromagnetic waves having a wavelength of 0.7 μm to 1.45 μm).

The infrared light irradiation source 14 may be configured as another light that is capable of irradiating infrared light, such as an infrared lamp. Preferably, the infrared light irradiation source 14 irradiates infrared light of a single wavelength in the range of 0.7 μm to 1.45 μm. However, when the infrared light irradiation source 14 irradiates infrared light having a peak intensity at a wavelength in the above range, the infrared light irradiation source 14 may irradiate infrared light that includes other light such as visible light and ultraviolet.

Preferably, the infrared light irradiation source 14 irradiates near infrared light having a peak intensity at a wavelength in the range of 0.70 μm to 1.45 μm. More preferably, the infrared light irradiation source 14 irradiates near infrared light having a peak intensity at a wavelength in a range of 0.80 μm to 1.00 μm. From the viewpoint of an LED light source which is readily available, it is particularly preferably that the infrared light irradiation source 14 irradiates near infrared light having a peak intensity at a wavelength in a range of 0.85 μm to 0.95 μm. In the present embodiment, the infrared light irradiation source 14 irradiates near infrared light having a wavelength of 860 nm.

The irradiation optical system 15 includes an irradiation casing 16 that has a cylindrical shape with its axial direction arranged in the horizontal direction. A connection adapter 17 and an upper mirror unit 18 are fixed above the retainer frame 11, and one edge of the irradiation casing 16 is fixed to the upper mirror unit 18.

A light source lens 19 adjacent to the infrared light irradiation source 14 and a field lens 20 are arranged in the irradiation casing 16, and a field stop 21 having a plate-like shape is arranged between the light source lens 19 and the field lens 20. Above the stage 12, a condenser lens 22 is arranged such that the axial direction thereof is perpendicular to, i.e., orthogonal to the axial direction of the irradiation casing 16. The condenser lens 22 is fixed to the connection adapter 17.

The upper mirror unit 18 is provided with an upper mirror 23 that is arranged at an inclination of 45 degrees with respect to both the direction perpendicular to the stage 12 and the axial direction of the irradiation casing 16. Infrared light irradiated in the horizontal direction toward the irradiation casing 16 from the infrared light irradiation source 14 is reflected by the upper mirror 23 between the infrared light irradiation source 14 and the stage 12 and bent downward at an angle of 90 degrees. Thus, infrared light irradiated from the infrared light irradiation source 14 is reflected by the upper mirror 23 and then incident on the sample placed on the stage in a direction perpendicular to the sample.

As illustrated in FIG. 2 and FIG. 3, the observation optical apparatus 8 serving as an observation optical system includes an objective lens 24 and an imaging lens 25 that has a magnification changing function, and is arranged under the stage 12.

The objective lens 24 is arranged coaxially with the condenser lens 22 under the stage 12. The objective lens 24 is fixed to the retainer frame 11 and thus has a fixed distance from the condenser lens 22.

The imaging lens 25 includes: a cylindrical lens frame 25a that has the image sensor 9 fixed thereto and is movable in accordance with a zooming operation: a movable lens frame 25b that has a cylindrical shape and is combined with the lens frame 25a in a movable manner in the axial direction in accordance with a zooming operation in a manner similar to the lens frame 25a; and a fixed lens frame 25c fixed to the casing 2.

A lower mirror unit 26 is fixed under the retainer frame 11. The imaging lens 25 is arranged such that its axial direction extends along the horizontal direction, and has an edge fixed to the lower mirror unit 26.

The lower mirror unit 26 is provided with a lower mirror 27 that is inclined at an angle of 45 degrees with respect to both the direction perpendicular to the stage 12 and the axial direction of the imaging lens 25. Infrared light having passed through the objective lens 24 is reflected by the lower mirror 27, bent at an angle of 90 degrees between the objective lens 24 and the imaging lens 25, and then directed to the axial direction of the imaging lens 25.

The fixed lens frame 25c is provided with a fixed lens system 28, and the movable lens frame 25b is provided with the movable lens system 29. Further, a pair of lens frames 25a and 25b is connected together via a cam mechanism (not illustrated). When the cam mechanism is driven by an electric motor (not illustrated), the pair of lens frames 25a and 25b is moved relative to each other in the axial direction and changes a magnification of the observation optical apparatus 8.

The image sensor 9 is fixed to an edge of the imaging lens 25, that is, an edge of the lens frame 25a (i.e., an end on the side opposite from the lower mirror unit 26). In the present embodiment, the image sensor 9 corresponds to a wide band to be capable of detecting both infrared light and visible light, and can capture both an infrared image and a visible light image of the sample placed on the stage 12. That is, the image sensor 9 serves as the image sensor for capturing an infrared image of the sample and as the image sensor for capturing a visible light image of the sample. The image sensor 9 can be configured as, for example, a CCD image sensor (Charge Coupled Device Image Sensor) or a CMOS image sensor (Complementary Metal Oxide Semiconductor Image Sensor) that is mounted on a substrate 30, or another type of image sensor.

The image sensor 9 is not limited to be fixed to the edge of the imaging lens 25 and may be fixed to an inner surface of the casing 2 or the like so as to have a fixed distance along the optical direction from the objective lens 24.

The imaging lens 25 forms a sample image having passed through the objective lens 24 on the image sensor 9. Also, the imaging lens 25 can change the magnification of the sample image focused on the image sensor 9 in response to an operation of the cam mechanism to change a distance between the fixed lens system 28 and the movable lens system 29 and a positional relationship between them and the image sensor 9.

A diaphragm ring 31 is arranged with respect to the irradiation optical system 15, and a phase plate 32 is arranged with respect to the observation optical apparatus 8. The diaphragm ring 31 is arranged at a position corresponding to a focal point of the condenser lens 22 between the upper mirror 23 and the condenser lens 22. The phase plate 32 is fixed to the bottom of the objective lens 24 and arranged at a position for optically conjugating with the diaphragm ring 31 between the objective lens 24 and the lower mirror 27.

The phase contrast microscope 1 includes the infrared light irradiation apparatus 7 that employs the Koehler illumination, the diaphragm ring 31, and the phase plate 32 as described above and thus enables phase contrast observation of the sample placed on the stage 12 using infrared light. That is, the phase contrast microscope 1 can be used in the phase contrast observation mode that uses infrared light as a light source. In a case in which a hair is used as a sample, by using the phase contrast microscope 1 in the phase contrast observation mode that uses infrared light as a light source, an inside of the hair can be observed in detail.

The objective lens 24 is configured as an Afocal optical system that emits balanced light and provided with the phase ring 33 in addition to the phase plate 32 on the emitting side. The imaging lens 25 is designed such that the phase ring 33 does not affect an image formed on the imaging surface. Also, an entrance pupil position P1 of the imaging lens 25 is provided between the lower mirror 27 and the objective lens 24, and a conjugate point P2 of the phase plate 32 is positioned on the right side of the imaging surface of the image sensor 9 in the figure, that is, on the side opposite from the imaging lens 25.

A pair of visible light irradiation sources 34 is arranged between the condenser lens 22 and the diaphragm ring 31. The pair of visible light irradiation sources 34 can irradiate visible light to the sample placed on the stage 12. The phase contrast microscope 1 can switch the light source to the visible light irradiation source 34 from the infrared light irradiation apparatus 7 and thus can perform bright field observation that irradiates visible light to the sample. As described above, the phase contrast microscope 1 is configured to be able to switch between the phase contrast observation mode for performing phase difference observation that irradiates infrared light to the sample placed on the stage 12 and the bright field observation mode for performing bright field observation that irradiates visible light to the sample placed on the stage 12.

The control board 10 controls each elements and the like constituting the phase contrast microscope 1 and is arranged longitudinally along the inner surface of the casing 2. To the control board 10, the infrared light irradiation source 14 of the infrared light irradiation apparatus 7, the drive unit 13 for driving the stage 12, the electric motor for driving the imaging lens 25, and the image sensor 9 are connected. The control board 10 may be connected to an external power source such as a commercial power source via a wiring (not illustrated). A power source such as a battery may be provided in the casing 2 to supply electric power to the control board 10.

The control board 10 is provided with a connector unit 36, and the display apparatus 5 is connected to the control board 10 via a cable 37 configured as a USB cable or the like connected to the connector unit 36. A magnified sample image captured by the image sensor 9 is output to the display apparatus 5 via the control board 10 and the cable 37. The phase contrast microscope system may have a configuration in which the display apparatus 5 is integrally incorporated into the phase contrast microscope 1.

In the present embodiment, the display apparatus 5 is configured as a tablet terminal (a tablet PC) that includes a CPU (Central Processing Unit) and a memory 5b configured as a storage or a hard disc and functions as a computer. The display apparatus 5 may include a display unit 5a configured as a liquid crystal panel or the like and display an image captured by the image sensor 9 on the display unit 5a.

The memory 5b provided to the display apparatus 5 may store an image captured by the image sensor 9. For example, the display apparatus 5 can store a first captured image obtained by observing a sample in the phase contrast observation mode and a second captured image obtained by observing the same sample in the visible light observation mode. The display apparatus 5 may display the first captured image and the second captured image stored in the memory 5b on the display unit 5a of the display apparatus 5.

In this case, the display apparatus 5 can comparably display the first captured image and the second captured image stored in the memory 5b on the display unit 5a. As a method for comparably displaying the first captured image and the second captured image on the display unit 5a, the display apparatus 5 may simultaneously display the first captured image and the second captured image arranged side by side or vertically on the display unit 5a. Alternatively, the display apparatus 5 may alternately display the first captured image and the second captured image on the display unit 5a. The method for comparably displaying the first captured image and the second captured image on the display unit 5a is not limited thereto and may be various manners.

The display apparatus 5 also includes an image processing unit 5c. The image processing unit 5c can color the first captured image by adding color information of the second captured image obtained by observing a sample in the bright field observation mode to illuminance information of the first captured image obtained by observing the same sample in the phase contrast observation mode. Then, the display apparatus 5 can display a first captured image colored by the image processing unit 5c on the display unit 5a.

The display unit 5a of the display apparatus 5 is configured as a touch panel (also called as a touch screen, etc.) and can operate or adjust the phase contrast microscope 1 such as switching between the observation modes, changing a magnification, adjusting a visual field position of a sample, adjusting a focal point, and the like.

Next, procedure of hair observation using the phase contrast microscope system described above will be described.

First, a sample hair is arranged on a preparation 4 that can be observed by the phase contrast microscope 1, and then the preparation 4 is inserted into the sample entry 3 such that a sample hair is placed on the stage 12. The sample hair does not need to be cut in the longitudinal cross-section and may be placed on the preparation 4 as it stands.

Next, phase contrast observation is performed on the sample hair in the phase contrast observation mode using the infrared light irradiation source 14 that irradiates infrared light to the sample hair placed on the stage 12. When infrared light is irradiated to the sample hair placed on the stage 12, an infrared image of the sample hair is magnified by the observation optical apparatus 8, formed on the image sensor 9, and then captured by the image sensor 9. An image captured by the image sensor 9 is displayed as the first captured image on the display unit 5a of the display apparatus 5. Thus, the internal structure of the cortex and the medulla in addition to the cuticle of the hair is magnified and displayed on the display unit 5a in detail.

As described above, the phase contrast microscope system of the present embodiment performs phase contrast observation by irradiating infrared light which has a longer wavelength than visible light, captures an infrared image using the image sensor 9 capable of detecting infrared light, and then displays the infrared image on the display unit 5a of the display apparatus 5. Thus, by using the hair as it stands without the necessity for a work to cut the hair in the longitudinal cross-section, the detailed internal structure of the hair such as the cortex and the medulla in addition to the cuticle of the hair can be clearly displayed on the display apparatus 5. Thus, a user who observes or makes a diagnosis of the hair can observe the internal structure of the hair in detail simply by viewing the first captured image displayed on the display unit 5a. By using the phase contrast microscope 1 in the phase contrast observation mode as described above, the inside of the sample hair can be easily observed in detail. Further, the health condition of the hair or the human body can be easily diagnosed based on the first captured image of the hair displayed on the display unit 5a, and the accuracy of the diagnosis can be improved.

Also, focus adjustment or magnification change of the first captured image displayed on the display unit 5a can be appropriately performed by operating operation keys displayed on the display unit 5a.

Figure 4:
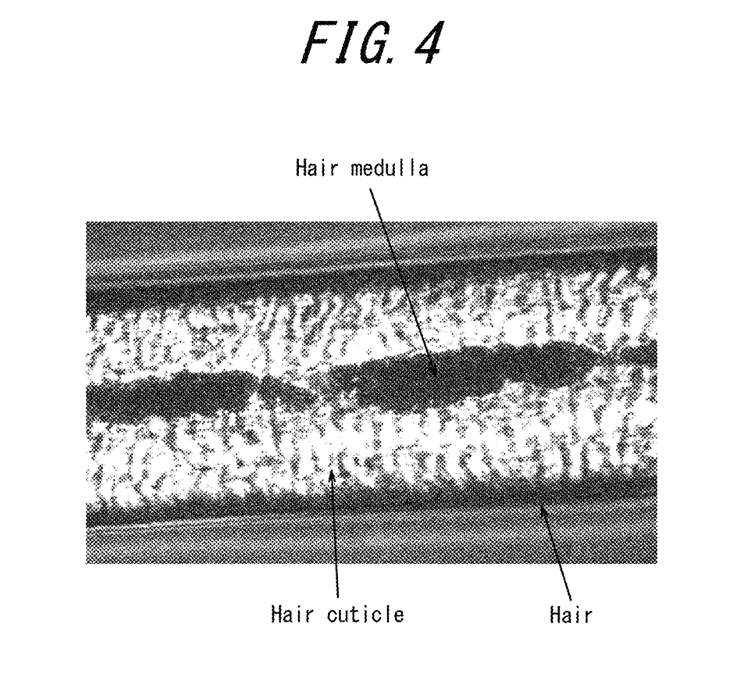
FIG. 4 is a diagram illustrating an example of a captured image of a hair obtained by the phase contrast microscope illustrated in FIG. 1.

Here, by adjusting the focal point with respect to the hair to the midpoint between the cuticle and the medulla of the sample hair, both the inside and the surface of the hair can be clearly displayed on the display section 5a of the display apparatus 5 at the same time. FIG. 4 illustrates an image of the hair displayed on the display unit 5a when the focal point with respect to the hair is adjusted to the midpoint between the cuticle and the medulla of the hair. It can be seen from this image that the medulla constituting the internal structure of the hair and the cuticle constituting the surface structure of the hair are clearly displayed in the same image at the same time. Because the medulla and the cuticle of the hair can be simultaneously observed in detail as described above, a user can easily and reliably make a diagnosis of the health condition of the hair or the human body by observing the image.

In the phase contrast microscope system of the present embodiment, the infrared light irradiation source 14 irradiates near infrared light having a peak intensity at a wavelength in the range of 0.70 μm to 1.45 μm to the sample hair. Thus, particularly when the focal point with respect to the hair is adjusted to the midpoint between the cuticle and the medulla of the hair and the cuticle and the medulla are simultaneously displayed on the display unit 5a, the cuticle and the medulla can be more clearly displayed.

In the phase contrast microscope system of the present embodiment, by switching light to be irradiated to the sample hair to visible light irradiated by the visible light irradiation source 34 from infrared light irradiated by the infrared light irradiation source 14, the observation mode can be switched to the bright field observation mode from the phase contrast observation mode. This switchover enables the first captured image obtained by performing phase contrast observation of the hair and the second captured image obtained by performing bright field observation of the same hair to be comparably displayed on the display unit 5a of the display apparatus 5. Thus, in observing or making a diagnosis of the hair, the user can more easily and reliably observe or make a diagnosis of the hair by comparing the internal structure of the hair obtained by performing phase contrast observation and the state and color of the surface of the hair obtained by performing bright field observation.

In the phase contrast microscope system of the present embodiment, the image processing unit 5c colors the first image by adding color information of the second captured image obtained by performing bright field observation to the luminance information of the first captured image obtained by performing phase contrast observation, and then displays a colored first captured image on the display unit 5a of the display apparatus 5. Thus, in a case in which a focal point to the hair is adjusted and the medulla and the cuticle of the hair are simultaneously displayed on the display unit 5a, the medulla and the cuticle can be more clearly displayed on the display unit 5a. This enables the user to observe or make a diagnosis of the hair more easily and reliably.

Further, in the phase contrast microscope system of the present embodiment, the image sensor 9 is used as the image sensor for capturing an infrared image of the hair and also as the image sensor for capturing a visible light image of the hair, such that the image sensor 9 obtains both the first captured image and the second captured image. Thus, the phase contrast microscope system can have a simple configuration that can be produced at low cost and may be easily operated.

Preferably, the preparation 4 used by the hair observation method or the phase contrast microscope system of the present embodiment described above has the configuration illustrated in FIG. 5A and FIG. 5B. Note that the preparation used by the hair observation method or the phase contrast microscope system of the present embodiment is not limited to the configuration illustrated in FIG. 5A and FIG. 5B.

Figure 5A:
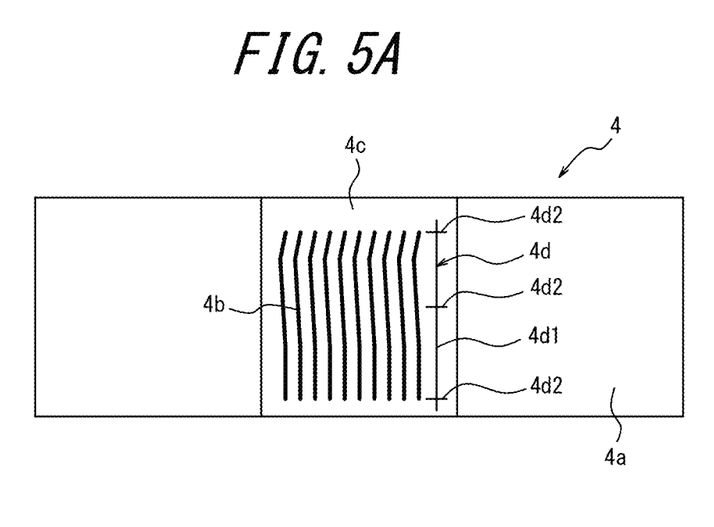
FIG. 5A is a plan view of a preparation.
Figure 5B:
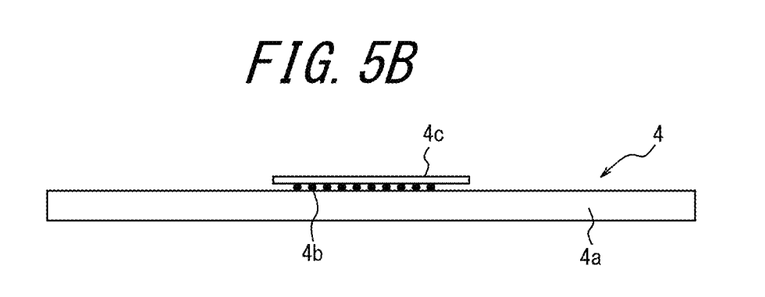
FIG. 5B is a side view of the preparation.

The preparation 4 of the present embodiment illustrated in FIG. 5A and FIG. 5B has a configuration in which a plurality of hair pieces 4b obtained by cutting a single hair is arranged in parallel with each other in the cutting order from one end to another end on the microscope glass 4a having the rectangular shape. In the illustrated case, a single hair is cut in a predetermined length from one end to the other end such that each of the hair pieces 4b has approximately the same length. That is, in the preparation 4 of the present embodiment, the sample hair is not placed on the microscope glass 4a as it stands and is cut into a plurality of hair pieces 4b each having the predetermined length and arranged in an order from the tip to the root of the hair on the microscope glass 4a. Although only one of the plurality of hair pieces 4b is denoted by the reference sign in FIG. 5A and FIG. 5B for convenience, ten hair pieces 4b are arranged on the microscope glass 4a.

In the present embodiment, each of the hair pieces 4b is 10 mm in length and arranged parallel to the transverse side of the microscope glass 4a. Further, each of the hair pieces 4b has a predetermined gap from an adjacent hair piece 4b, and each end of the hair pieces 4b is aligned at a predetermined distance from the longitudinal sides of the microscope glass 4a.

The length and the number of the hair pieces 4b can be appropriately determined, and the hair piece 4b may be arranged parallel to the longitudinal sides of the microscope glass 4a. Also, a plurality of hair pieces 4b arranged on the microscope glass 4a do not need to have a predetermined length and may have different lengths.

The cover glass 4c having a square shape is placed on the surface of the microscope glass 4a and covers the plurality of hair pieces 4b. A mounting agent is not introduced between the microscope glass 4a and the cover glass 4c, and the cover glass 4c is slid on and fixed onto the microscope glass 4a. By fixing the cover glass 4c to the microscope glass 4a, the hair pieces 4b are sandwiched between the microscope glass 4a and the cover glass 4c and fixed to the microscope glass 4a.

The microscope glass 4a is provided with a graduation mark 4d. The graduation mark 4d includes a reference line 4d1 that extends in a direction parallel to the transverse sides of the slide glass 4a and a plurality of (three in the illustrated example) scales 4d2 that extend in a direction perpendicular to the reference line 4d1. The hair pieces 4b are arranged in parallel with the reference line 4d1 on the microscope glass 4a, and the scales 4d2 are arranged at predetermined intervals. The graduation mark 4d enables determination on longitudinal positions of the hair pieces 4b.

The graduation mark 4d may be directly drawn using ink or the like on the surface of the microscope glass 4a or, for example, formed as grooves on the surface of the microscope glass 4a. Alternatively, a film or a sticker that includes a graphical image of the graduation mark 4d may be adhered to the surface of the microscope glass 4a.

In the present embodiment, the graduation mark 4d includes three scales 4d2. However, the number of scales 4d2 may be more than three or otherwise appropriately determined. Also, two graduation marks 4d extending orthogonal to each other may be provided to the microscope glass 4a.

By using the preparation 4 having the above configuration, when observing a single hair using the phase contrast microscope 1, each portion of the hair in the longitudinal direction thereof can be efficiently observed. Further, in order to change a portion of the hair to be observed, the stage 12 is shifted along the scale 4d. Thus, each portion of the hair in the longitudinal direction thereof can be efficiently observed.

Further, the preparation 4 includes the microscope glass 4a provided with the graduation mark 4d as described above and thus enables the user to easily recognize a longitudinal position of a portion of the hair piece 4b being observed using the phase contrast microscope 1, simply by viewing the graduation mark 4d. Here, a plurality of hair pieces 4b are arranged in the order from the tip to the root. Thus, by recognizing a longitudinal position of a portion of the hair piece 4b being observed using the phase contrast microscope 1, the user can easily know which longitudinal portion of the hair is being observed using the phase contrast microscope 1.

In a case in which one hair arranged on the preparation 4 as described above is observed using the phase contrast microscope 1, when a degenerated portion of the internal structure or the surface structure of the hair is observed, the time when the degeneration has occurred can be analyzed based on a longitudinal position of the degenerated portion of the hair. For example, in a case in which a portion where the medulla is interrupted or the cuticle is missing is found, the time when such a change has occurred can be determined based on the longitudinal position of the portion of the hair with respect to the root. Thus, the health condition of the hair or the human body can be more accurately diagnosed in more detail.

Further, in the preparation 4 having the above configuration, the hair pieces 4b are fixed without a fixing agent introduced between the microscope glass 4a and the cover glass 4c. Thus, as compared to a case in which a fixing agent is introduced between the microscope glass 4a and the cover glass 4c, the cuticle of the hair observed by the phase contrast microscope 1 can be more clearly displayed on the display apparatus 5 together with the medulla. Thus, by observing the hair using the phase contrast microscope 1, the health condition of the hair or the human body can be more accurately diagnosed in more detail.

It should be appreciated that the present disclosure is not limited to the embodiment set forth above and may be modified in various manners without departing from the gist of the present disclosure.

For example, although the phase contrast microscope system is used to observe a hair in the above embodiment described above, the phase contrast microscope system may be used to observe samples other than a hair.

Figure 6:
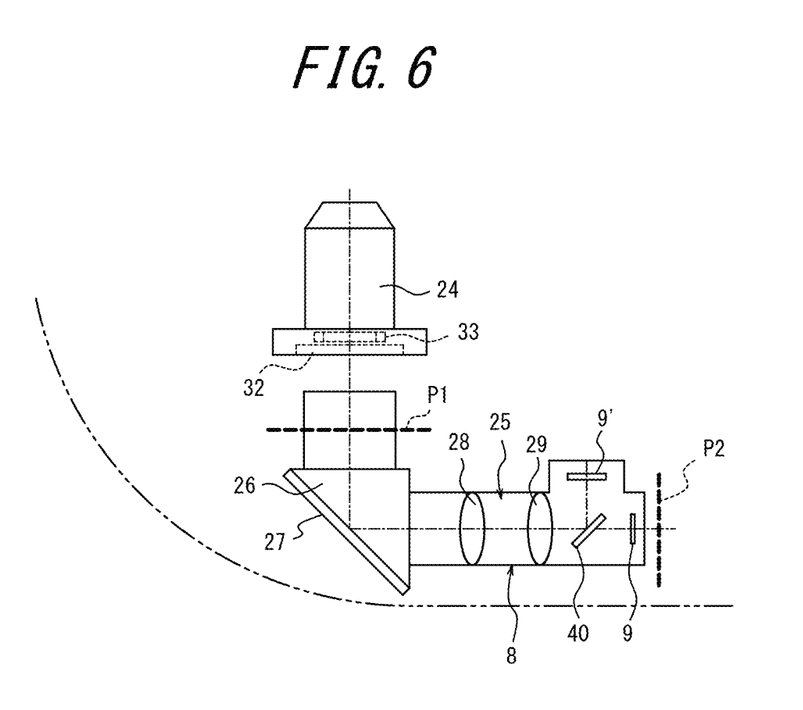
FIG. 6 is an explanatory diagram illustrating an example variation of the optical system illustrated in FIG. 3.

Further, in the phase contrast microscope 1 of the above embodiment, the image sensor 9 captures both a sample image obtained by performing phase contrast observation and a sample image obtained by performing bright filed observation. However, a first image sensor 9 for capturing a sample image obtained by performing phase contrast observation and a second image sensor 9' for capturing a sample image obtained by performing the bright field observation may be provided as illustrated in FIG. 6 by way of example. In this case, the first image sensor 9 is arranged on the axis of the observation optical apparatus 8, and the image sensor 9' is arranged on an axis bent at an angle of 90 degrees from the axial direction of the observation optical apparatus 8. An optical path switching mirror 40 capable of switching the optical paths is arranged at an intersection between the optical axis of the observation optical apparatus 8 and the optical axis of the image sensor 9'. When the phase contrast microscope 1 is switched to the phase contrast observation mode, the optical path of the observation optical apparatus 8 is directed to the first image sensor 9 by the optical path switching mirror 40 such that phase contrast observation is performed using the first image sensor 9. When the phase contrast microscope 1 is switched to the bright field observation mode, the optical path of the observation optical apparatus 8 is directed to the second image sensor 9' by the optical path switching mirror 40 such that bright field observation is performed using the second image sensor 9'. When the optical path switching mirror 40 changes the optical path of the observation optical apparatus 8 into the direction of the second image sensor 9' to perform bright field observation, the image captured by the second image sensor 9 becomes a mirror image. Thus, the image processing unit 5c or the like corrects the captured image to a normal image from the mirror image. Note that the first image sensor 9 for capturing the sample image obtained by performing phase contrast observation may be configured as a monochrome sensor capable of detecting infrared light, and the second image sensor 9' for capturing the sample image obtained by performing bright field observation may be configured as a color sensor such as a color image sensor into which RGB filters are incorporated in a Bayer arrangement. Further, phase contrast observation that irradiates visible light can be observed using the second image sensor 9'.

Although in the above embodiment the display apparatus 5 includes the memory 5b configured to store captured images, and image processing unit 5c, this is not restrictive. For example, the functions of the memory 5b and the image processing unit 5c may be provided to another member such as, for example, the control board 10 of the phase contrast microscope 1, or may be configured as independent apparatuses.

The hair observation method according to the above embodiment is not limited to a human hair and can be used for observing an animal hair.

Although the preparation 4 according to the above embodiment has the configuration in which the hair pieces 4b are fixed to the microscope glass 4a by the cover glass 4c, this is not restrictive. The hair pieces 4b may be fixed to the microscope glass 4a by an adhesive tape or the like.

Further, the preparation 4 according to the above embodiment can also be used for other hair observation methods or other phase contrast microscopes in addition to the hair observation method and the phase contrast microscope system of the above embodiment.

The invention claimed is:

1. A hair observation method for observing an inside of a hair, the hair observation method comprising:
   performing phase contrast observation by irradiating infrared light from an infrared light irradiation source to the hair;
   capturing an infrared image of the hair using an image sensor capable of detecting infrared light; and
   displaying the infrared image captured by the image sensor on a display apparatus and observing the inside of the hair,
   wherein
   the hair observation method further comprises performing bright field observation by irradiating visible light from a visible light irradiation source to the hair, the visible light irradiation source being different from the infrared light irradiation source,
   the visible light irradiation source is disposed downstream of the infrared light irradiation source along an optical path of the infrared light, and
   the visible light irradiation source and the infrared light irradiation source are disposed above a stage having the hair placed thereon in a vertical direction.

2. The hair observation method according to claim 1, further comprising:
   capturing a visible light image of the hair using an image sensor capable of detecting visible light; and
   observing the inside of the hair using a first captured image obtained by performing the phase contrast observation that irradiates infrared light to the hair and a second captured image obtained by performing bright field observation that irradiates visible light to the hair.

3. The hair observation method according to claim 2, wherein the first captured image and the second captured image are comparably displayed on the display apparatus.

4. The hair observation method according to claim 2, wherein the first captured image is colored by adding color information of the second captured image to illuminance information of the first captured image, and a colored first captured image is displayed on the display apparatus.

5. The hair observation method according to claim 2, wherein the image sensor is used as the image sensor for capturing the infrared image of the hair and also as the image sensor for capturing a visible light image of the hair.

6. The hair observation method according to claim 1, wherein infrared light irradiated to the hair is near infrared light having a peak intensity at a wavelength in a range of 0.70 to 1.45 μm.

7. A phase contrast microscope system for performing phase contrast observation of a sample, the phase contrast microscope system comprising:
   a stage having the sample placed thereon;
   an infrared light irradiation source for irradiating infrared light to the sample placed on the stage;
   an image sensor that is capable of detecting infrared light and configured to capture an infrared image of the sample; and
   a display apparatus configured to display the infrared image captured by the image sensor,
   wherein
   the phase contrast microscope system further comprises a visible light irradiation source different from the infrared light irradiation source and configured for irradiating visible light to the sample placed on the stage to perform bright field observation,
   the visible light irradiation source is disposed downstream of the infrared light irradiation source along an optical path of the infrared light, and
   the visible light irradiation source and the infrared light irradiation source are disposed above the stage in a vertical direction.

8. The phase contrast microscope system according to claim 7, further comprising:
   an image sensor that is capable of detecting visible light and configured to capture a visible light image of the sample,
   wherein the phase contrast microscope system is configured to be able to switch between a phase contrast observation mode for performing phase contrast observation by irradiating infrared light to the sample and a bright field observation mode for performing visible light observation by irradiating visible light to the sample, and
   the phase contrast microscope system can display a first captured image obtained in the phase contrast observation mode and a second captured image obtained in the bright field observation mode on the display apparatus.

9. The phase contrast microscope system according to claim 8, comprising:
   a memory configured to store the first captured image and the second captured image,
   wherein the first captured image and the second captured image are comparably displayed on the display apparatus.

10. The phase contrast microscope system according to claim 8, comprising:
    an image processing unit configured to color the first captured image by adding color information of the second captured image to illuminance information of the first captured image,
    wherein the first captured image colored by the image processing unit is displayed on the display apparatus.

11. The phase contrast microscope system according to claim 8,
    wherein the image sensor is used as the image sensor for capturing the infrared image of the sample and also as the image sensor for capturing the visible light image of the sample.

12. The phase contrast microscope system according to claim 7,
    wherein the infrared light irradiation source irradiates near infrared light having a peak intensity at a wavelength in a range of 0.70 to 1.45 μm.

13. A preparation used for the hair observation method according to claim 1, the preparation comprising:
- a microscope glass: and
- a plurality of hair pieces obtained by cutting one hair and arranged on the microscope glass in a manner parallel to one another in a cutting order from one end to another end.

14. The preparation according to claim 13, wherein the microscope glass is provided with a graduation line that enables determination on a longitudinal location of the hair piece.

15. The preparation according to claim 14, wherein the microscope glass is provided with a plurality of scales that are arranged in parallel with the hair piece.

16. The preparation according to claim 13, wherein the plurality of hair pieces are fixed to the microscope glass by a cover glass.

17. The hair observation method according to claim 1, wherein a mirror is disposed between the infrared light irradiation source and the visible light irradiation source to change the optical path of the infrared light to a direction perpendicular to the stage.

18. The phase contrast microscope system according to claim 7, further comprising a mirror disposed between the infrared light irradiation source and the visible light irradiation source to change the optical path of the infrared light to a direction perpendicular to the stage.

* * * * *